US012471582B1

(12) United States Patent
Habeger

(10) Patent No.: US 12,471,582 B1
(45) Date of Patent: Nov. 18, 2025

(54) QUICK-CHANGE SCENT DISBURSEMENT FISHING LURE

(71) Applicant: Donald Habeger, Juneau, AK (US)

(72) Inventor: Donald Habeger, Juneau, AK (US)

(*) Notice: Subject to any disclaimer, the term of this patent is extended or adjusted under 35 U.S.C. 154(b) by 0 days.

(21) Appl. No.: 19/082,608

(22) Filed: Mar. 18, 2025

(51) Int. Cl.
A01K 85/01 (2006.01)
A01K 85/14 (2006.01)

(52) U.S. Cl.
CPC ............ A01K 85/018 (2022.02); A01K 85/14 (2013.01)

(58) Field of Classification Search
CPC .............................. A01K 85/018; A01K 85/14
USPC ........................................................ 43/42.06
See application file for complete search history.

(56) References Cited

U.S. PATENT DOCUMENTS

| | | | |
|---|---|---|---|
| 2,214,409 A | 9/1940 | Eaby | |
| 4,713,906 A | 12/1987 | Distaffen | |
| 4,765,086 A | 8/1988 | Schultz | |
| 4,823,495 A * | 4/1989 | Camilleri | A01K 85/14 43/42.49 |
| 4,914,849 A | 4/1990 | Hook | |
| D374,907 S | 10/1996 | Kethum | |
| 7,676,982 B1 * | 3/2010 | Lee | A01K 97/00 43/53.5 |
| 8,413,367 B1 * | 4/2013 | Stirtz | A01K 91/065 43/43.13 |
| 8,931,204 B1 * | 1/2015 | Thomson | A01K 85/01 43/42.32 |
| 9,049,852 B1 * | 6/2015 | Moran, Jr. | A01K 85/14 |
| 9,078,421 B1 * | 7/2015 | Rye | A01K 85/10 |
| 9,504,237 B2 * | 11/2016 | Culver | A01K 85/00 |
| D849,880 S * | 5/2019 | Naig | D22/129 |
| 10,660,320 B2 * | 5/2020 | Bailey | A01K 85/01 |
| D910,801 S * | 2/2021 | Beath | D22/129 |
| 11,083,177 B2 * | 8/2021 | Richardson | A01K 85/01 |
| 2012/0055316 A1 * | 3/2012 | Smith | A01K 85/14 84/404 |
| 2014/0150329 A1 | 6/2014 | Waldroup | |
| 2014/0290119 A1 | 10/2014 | Onishi | |
| 2015/0189863 A1 * | 7/2015 | Stanaland | A01K 83/06 43/4.5 |
| 2018/0288989 A1 * | 10/2018 | Cooper | A01K 97/05 |
| 2020/0352148 A1 * | 11/2020 | Mancini | A01K 85/01 |
| 2023/0055970 A1 * | 2/2023 | Kertz | A01K 85/018 |
| 2024/0365763 A1 * | 11/2024 | Goehler | A01K 85/018 |

FOREIGN PATENT DOCUMENTS

JP 2000300119 A 10/2000

* cited by examiner

Primary Examiner — Christopher P Ellis

(57) ABSTRACT

An exemplary fishing lure includes a lure body comprised of at least two spoon-shaped portions. A slot is disposed through the lure body. A replaceable scent disbursement component is removably coupled to the lure body by a keeper, which is movably coupled to one of the spoon shaped portions and extends past the slot.

20 Claims, 6 Drawing Sheets

800 ↘

```
┌─────────────────────────────────────────────────────────┐
│  PROVIDE A LURE BODY HAVING AN UPPER PORTION AND A      │
│  LOWER PORTION, AT LEAST ONE OF THE UPPER PORTION       │
│  AND THE LOWER PORTION BEING SPOON-SHAPED               │
│                         802                             │
└─────────────────────────────────────────────────────────┘
                            │
                            ▼
┌─────────────────────────────────────────────────────────┐
│  PROVIDE A SLOT THROUGH THE LURE BODY                   │
│  BETWEEN THE UPPER PORTION AND THE LOWER PORTION        │
│                         804                             │
└─────────────────────────────────────────────────────────┘
                            │
                            ▼
┌─────────────────────────────────────────────────────────┐
│  MOVABLY COUPLE A FIRST END OF A KEEPER                 │
│  TO THE UPPER PORTION OF THE LURE BODY                  │
│                         806                             │
└─────────────────────────────────────────────────────────┘
                            │
                            ▼
┌─────────────────────────────────────────────────────────┐
│  RELEASABLY ATTACH A REPLACEABLE SCENT DISBURSEMENT     │
│  COMPONENT TO THE KEEPER; AND                           │
│                         808                             │
└─────────────────────────────────────────────────────────┘
                            │
                            ▼
┌─────────────────────────────────────────────────────────┐
│  RELEASABLY SECURE A SECOND END OF THE KEEPER TO        │
│  THE LURE BODY.                                         │
│                         810                             │
└─────────────────────────────────────────────────────────┘
```

FIG. 8

QUICK-CHANGE SCENT DISBURSEMENT FISHING LURE

BACKGROUND OF THE INVENTION

In the world of fishing lures, there is a need to increase the absorption of scent oils into a lure and ultimately, the distribution of a scent trail from the lure to attract game fish (e.g., salmon, etc.). One problem with prior art lures is inducing a scent trail while using an artificial lure setup. Most salmon lures, for example, are smooth bodied metal, wood, soft plastic, or hard plastic. When scent oils are applied to these artificial lure setups and set in the water, an oil sheen generally forms on the water's surface as the scent oils are rinsed from the lure. Further, when the artificial lure is retrieved after trolling, no overt evidence exists (one cannot feel or smell the scent product) that the scent oil remained for any length of time on the lure. It appears that the problem with such lures is that the scent oils leave the lure after a very short period of time, making them not particularly effective during a troll.

Another common lure option used for game fishing is rigging up a once-frozen bait fish, such as a herring. The herring can present a natural looking lure to game fish and generally releases a scent trail when pulled through the water. While a thawed herring most likely gives off a scent trail temporarily, the soft flesh generally gives way during trolling, resulting in a lure presentation that becomes less than natural.

BRIEF DESCRIPTION OF DRAWINGS

The detailed description is set forth with reference to the accompanying figures. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure. Shapes and/or dimensions shown in the illustrations of the figures are for example, and other shapes and or dimensions may be used and remain within the scope of the disclosure, unless specified otherwise.

FIG. 8 is a flow diagram illustrating an example process of providing a quick-change scent disbursement fishing lure, according to an implementation.

DETAILED DESCRIPTION OF THE INVENTION

The subject matter of the present disclosure is described with specificity to meet statutory requirements. However, the description itself is not intended to limit the scope of this disclosure. Rather, the claimed or disclosed subject matter might also be embodied in other ways to include different components, steps, or combinations thereof similar to the ones described in this document, in conjunction with other present or future technologies. Terms should not be interpreted as implying any particular order among or between various steps disclosed herein unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

Referring to FIGS. 1-7, representative examples of devices and techniques provide a long-lasting artificial fishing lure ("lure 100") with natural movement and with the added ability to lay down a long-term scent trail. Further, the artificial fishing lure 100 has the capability for the scent disbursement component 102 to be quickly changed for refreshing, renewing, or changing/selecting the scent disbursement used with the lure 100. The quick-change aspect of the lure 100 also allows for quick and easy setup and takedown of fishing gear. Additionally, separate storage or organization of lures 100 and scent components 102 is made simple and can be beneficial to avoid undesired contamination or degradation of the lures 100 or of the scent trail producing components 102.

Figure 1:
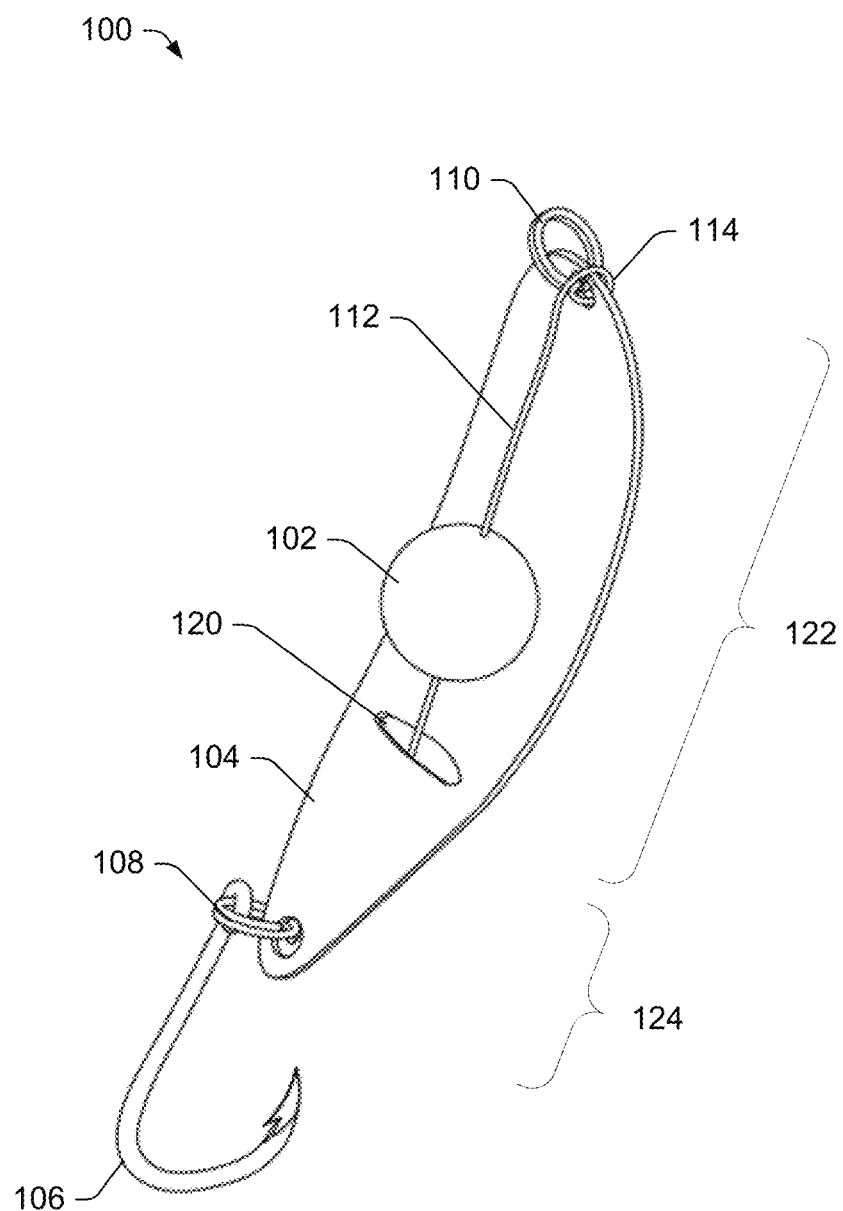
FIG. 1 is a front perspective view of an example quick-change scent disbursement fishing lure, according to an embodiment.

Referring to FIG. 1, an example lure 100 is shown in a front perspective view. The example lure includes a rigid or semi-rigid lure body 104 with various features and characteristics that are attractive to game fish. The lure 100 also includes a hook 106 that may be attached to one end of the lure body 104 via a connector 108, such as a split ring, or the like. Another connector 110 may be attached to the opposite end of the lure body 104, and used for attaching a fishing line, for example. As mentioned, the lure 100 further includes a replaceable scent component 102 that is releasably attached to the lure body 104.

In various embodiments, the scent component 102 can be releasably coupled to the lure body 104 via a keeper 112. The keeper 112 can be movably (or removably) coupled to the lure body 104 at one or both ends of the keeper 112. For instance, the keeper 112 can be movably coupled to the lure body 104 via a feature 114 at one end of the keeper 112. The other end of the keeper 112 can be held in a closed or trapped configuration by one or more features of the lure body 104. In one example, as shown at FIG. 1, the other end of the keeper 112 is held or trapped by a slot 120 disposed through the lure body 104.

As shown at FIGS. 1-4, the lure body 104 can have a generally ellipsoid or tear-drop perimeter shape, so as to move through the water fluidly. Variations on this general shape are also contemplated and are within the scope of the disclosure. The lure body 104 is formed to be thin (e.g., 2 to 5 millimeters thick, for example), with respect to the thickness of the lure body 104, rather than the width of the lure body 104. However, the width dimension of the lure body 104 is less than the length dimension of the lure body 104, to generally resemble a fish, for example. The lure body 104 may be formed in various sizes (with roughly similar proportions) to accommodate attracting smaller or larger game fish.

Figure 2:
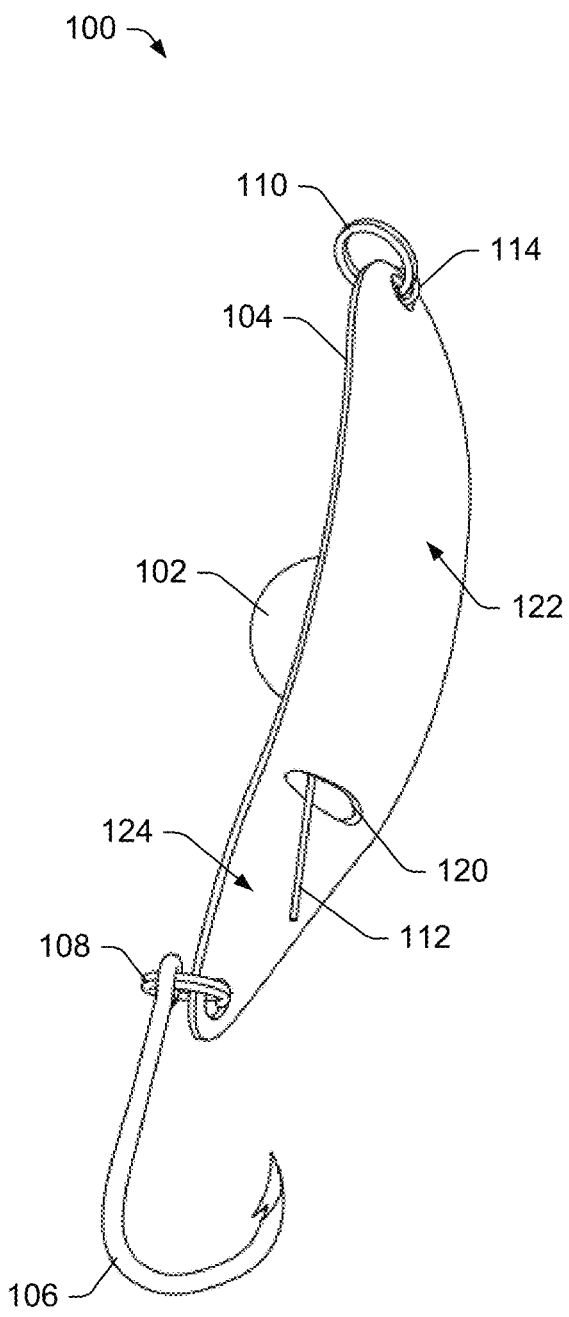
FIG. 2 is a back perspective view of the example quick-change scent disbursement fishing lure of FIG. 1, according to the embodiment.
Figure 3:
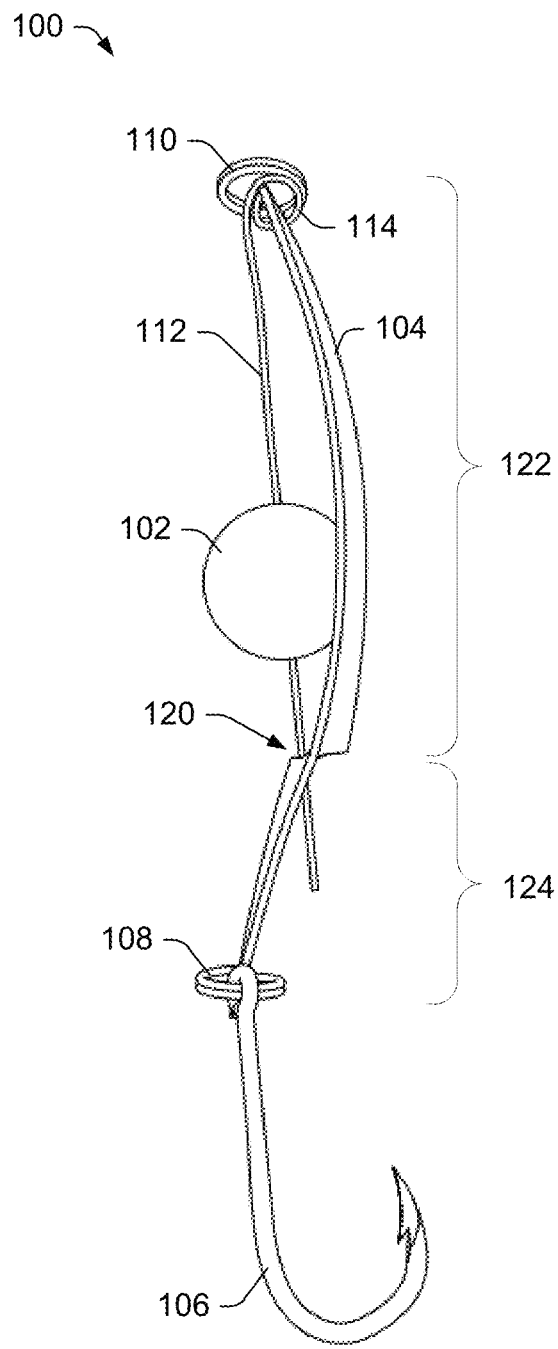
FIG. 3 is a side view of the example quick-change scent disbursement fishing lure of FIG. 1, according to the embodiment.
Figure 4:
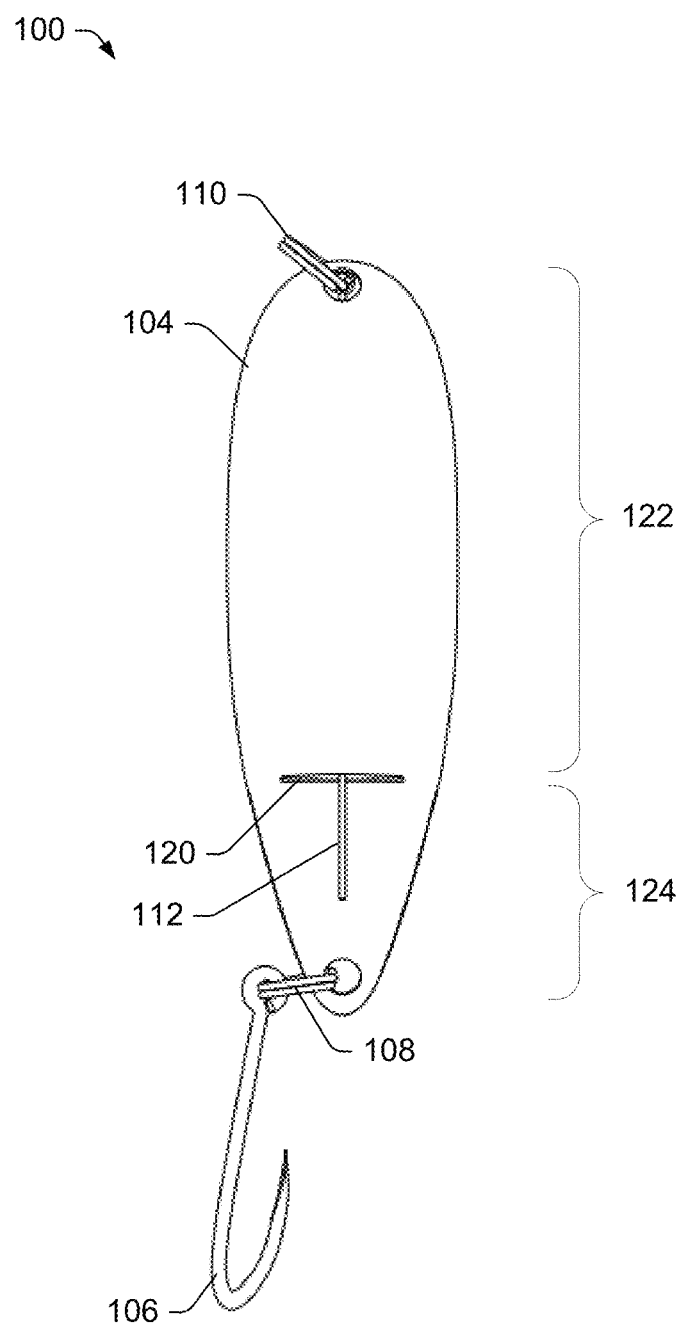
FIG. 4 is a back view of the example quick-change scent disbursement fishing lure of FIG. 1, according to the embodiment.

As can be seen at FIGS. 1-3, the lure body 104 comprises an upper portion 122 and a lower portion 124, where at least one of the upper portion 122 and the lower portion 124 is generally spoon-shaped. In some embodiments, both the upper portion 122 and the lower portion 124 are spoon shaped. The slot 120 is disposed between the upper portion 122 and the lower portion 124 and provides a transition between the two portions. For example, the upper portion 122 can comprise a spoon shape that is generally concave while the lower portion 124 can comprise a spoon shape that is generally convex (from the front perspective). In other words, the contour of the lure body 104 transitions from the concave upper portion 122 to the convex lower portion 124 at the slot 120. The transition can be greater at the central area of the lure body 104 and more gradual at the perimeter of the lure body 104.

In various embodiments, the depth of the curvature of contour (or depth of the central area of the spoon-shape) at the upper portion 122 or at the lower portion 124 can vary—and can include embodiments that have a very shallow "spoon" resulting in a more ribbon-like profile to embodiments that have a deeper "spoon" at the upper portion 122 and/or the lower portion 124. Each of these embodiments can be instrumental in determining the movement of the lure 100 as it is pulled through the water. For instance, the geometry of the lure body 104 provides a natural-like movement of the lure 100 so as to attract game fish, and the variations on the geometry can change the amount of movement and the type of movement (i.e., spinning, fluttering, swaying, rising, descending, and other undulations).

Further, the position, size and shape of the slot 120 can also have an impact on the fluid-dynamics of the lure 100. In various embodiments, the slot 120 is disposed lower than half-way down the lure body 104. In some cases, the slot 120 is disposed approximately two-thirds of the way down the lure body 104, or similarly. This results in a larger upper portion 122 and a smaller lower portion 124. It also results in the slot 120 forming an opening for water to pass through at a location lower down on the lure body 104. The passage of water through the slot 120 can also determine the movement of the lure 100 as it is pulled through the water. For instance, water moving through the slot 120 can create a more stable (less chaotic) movement of the lure 100, which can better approximate the movement of a fish. In alternative embodiments, the slot 120 may be disposed half-way down the lure body 104 or above the half-way point on the lure body 104, to provide different movement of the lure 100 as it is pulled through the water.

In various embodiments, the shape of the slot 120 comprises an ellipsoid, a polygon, or an irregular shape. The shape and size of the slot 120 can also be used to control the movement of the lure 100, and so the shape and size can vary for different applications. Since the slot 120 is disposed at the transition between the upper portion 122 and the lower portion 124, the slot 120 can be oriented so as to face the flow of water at various angles, which can increase the flow of water through the slot 120 (when the angle is more normal to the flow of water) or decrease the flow of water through the slot 120 (when the angle is less normal to the flow of water). The shape, size, and orientation of the slot 120 (as well as the position of the slot 120 on the lure body 104) can also influence the turbulence of the flow of water through the slot 120 and the water behind the lure 100. This turbulence can impact the distribution of fish attractant (e.g., scent oils, fluids, gels, etc.) from the scent component 102. Accordingly, the shape, size, orientation, and location of the slot 120 can impact the disbursement of attractant scent for the lure 100.

The lure body 104 can be formed of various materials or combinations of materials, including metals, polymers, composites, resins, natural or artificial rubbers, wood or wood products, and so forth. The selection of materials or material combinations affects characteristics of the lure body 104, such as the weight, motion, appearance, and scent of the lure body 104. Further, the appearance of the lure body 104 can be augmented or enhanced with various finishes, coatings, colors, features, or details as desired.

As mentioned, and shown in the figures, the lure body 104 can include one or more connectors 108 at one end of the lure body 104 and one or more connectors 110 at the opposite end of the lure body 104. The connectors 108 and 110 can comprise rings, split rings, D-rings, snap rings, safety snaps, swivel connectors, clasps, and so forth, and can be made of a metal, a polymer, or other materials.

Figure 5:
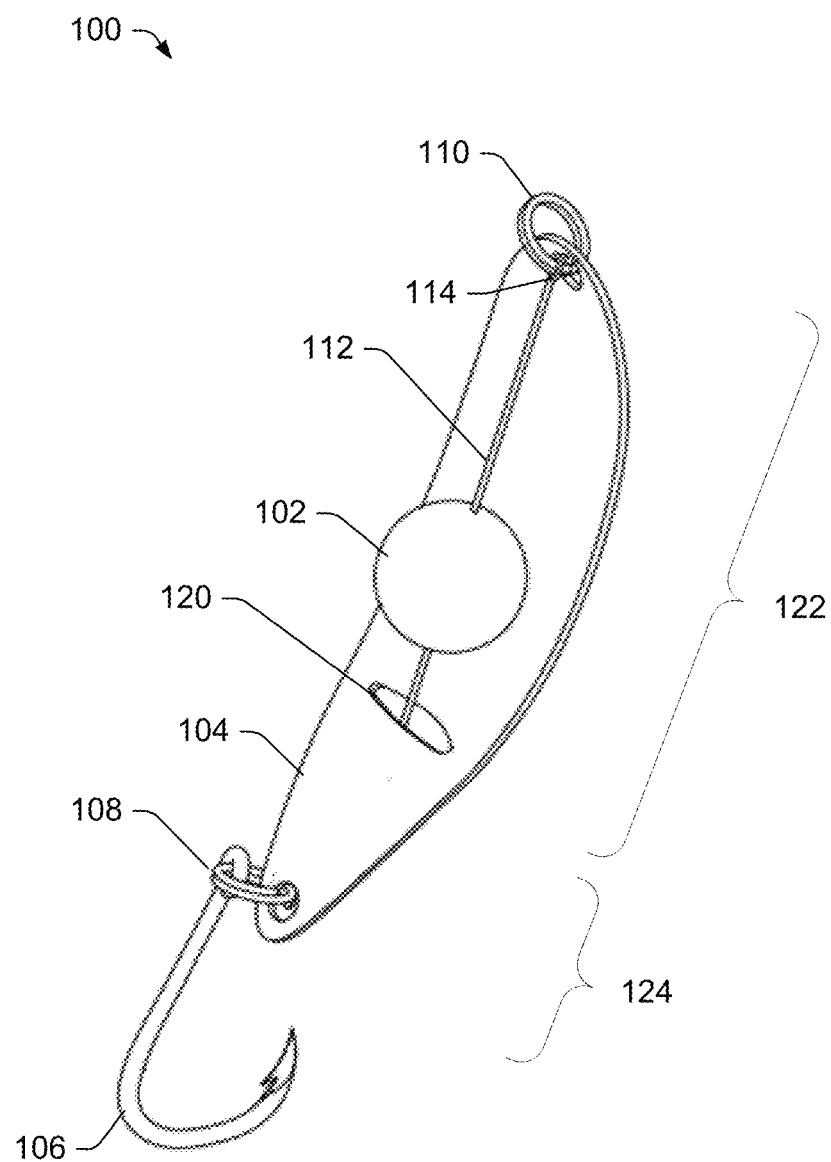
FIG. 5 is a front perspective view of an example quick-change scent disbursement fishing lure, according to another embodiment.
Figure 6:
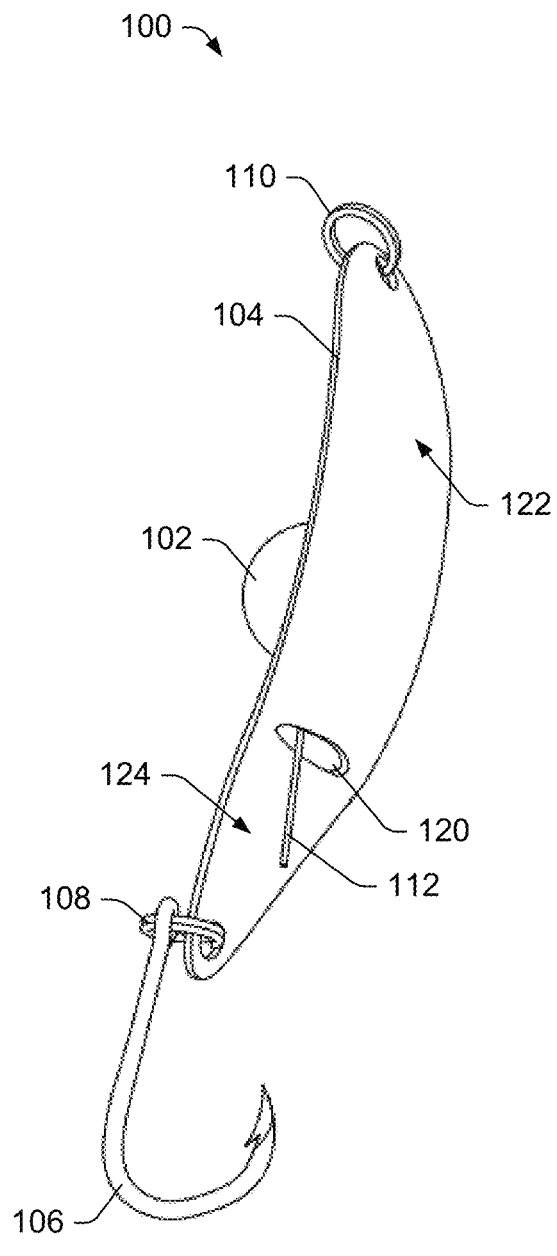
FIG. 6 is a back perspective view of the example quick-change scent disbursement fishing lure of FIG. 5, according to the embodiment.
Figure 7:
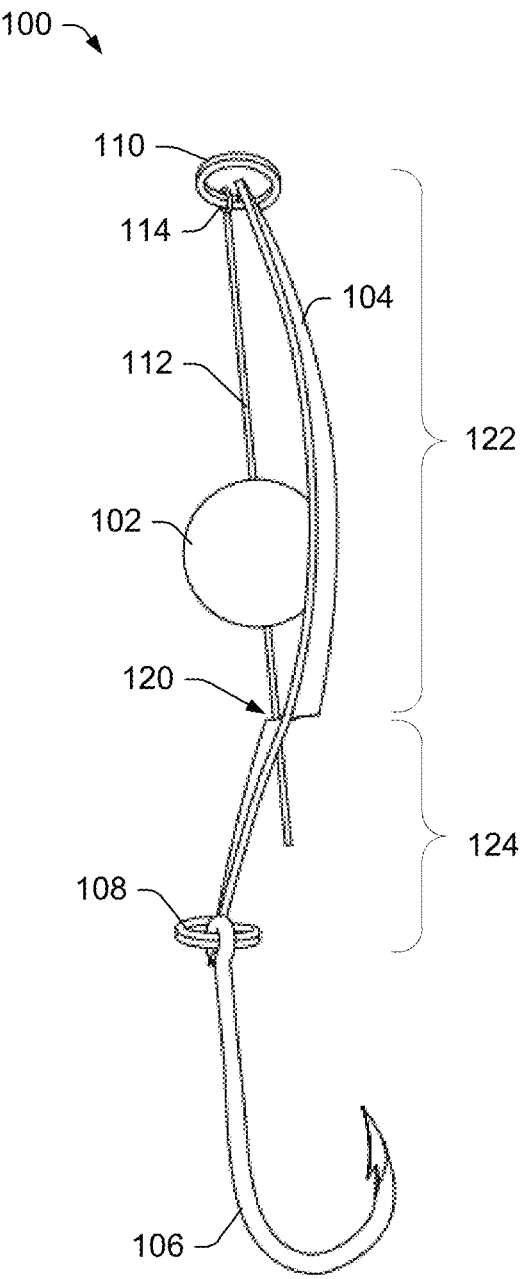
FIG. 7 is a side view of the example quick-change scent disbursement fishing lure of FIG. 5, according to the embodiment.

Connectors 108 and/or 110 can be coupled to the lure body 104 via holes in the lure body 104 as shown in the figures, or by some other means (e.g., clips, fasteners, adhesives, thermal attachments, welds, etc.) The connectors 108 and 110 can be useful to couple desired components to the lure body 104. For example, one or more hooks 106 can be coupled to one or more connectors 108 at the first end (e.g., the lower portion 124) of the lure body 104. A fishing line with associated components can be coupled to the one or more connectors 110 at the second end (e.g., the upper portion 122) of the lure body 104. The keeper 112 can be coupled to the lure body 104 via one or more of the connectors 110 (as shown at FIGS. 5-7) or can be coupled to the lure body 104 directly (as shown at FIGS. 1-4).

The keeper 112 can be comprised of a metallic wire in some embodiments. A first end of the keeper 112 can be bent to form the feature 114, which may resemble a circle or other shape. A feature 114 with a closed shape is useful to attach the first end of the keeper 112 to one or more of the connectors 110 (as shown at FIGS. 5-7) or to the lure body 104 through a hole, for example (as shown at FIGS. 1-4). The first end of the keeper 112 is movably coupled to the lure body 104 so as to provide the keeper 112 some freedom of movement for replacing the scent disbursement component 102.

The keeper 112 can also be capable of some bending, with the ability to return to its unbent resting shape and configuration. Some bending can be helpful for replacing the scent disbursement component 102, including for securing and releasing the second (opposite) end of the keeper 112. In some embodiments, as shown at FIGS. 1-7, the second end of the keeper 112 is trapped within the slot 120. The keeper 112 may be slightly bent (temporarily) to insert the second end of the keeper 112 into the slot 120. When released, the keeper 112 returns to its resting shape, which traps the second end of the keeper 112 in the slot 120. Further, the keeper 112 may be slightly bent (temporarily) to release the second end of the keeper 112 from the slot 120.

When the keeper 112 is free from the slot 120, one or more scent disbursement components 102 can be strung on the keeper 112 or removed from the keeper 112. Once the scent disbursement components 102 are disposed on the keeper 112, the second end of the keeper 112 can be inserted into the slot 120. This traps the scent disbursement components 102 on the keeper 112 until they is intentionally removed.

In one alternative embodiment, the keeper 112 is removably coupled to the opposite end of the lure body 104 rather than being trapped in the slot 120, or in addition to passing through the slot 120. The keeper 112 can be coupled to a connector 108, or to one or more features at the hook-end of the lure body 104. In another alternative embodiment, the keeper 112 comprises a filament instead of a wire. The filament may be comprised of fishing line or another durable polymer or fiber.

A scent disbursement component 102 can comprise a ball or mass of an absorbent or fibrous material, such as a yarn, or the like. The core of a scent disbursement component 102, if present, can include a small tube for stringing the scent disbursement component 102 on the keeper 112. Alternately, the core of the scent disbursement component 102 can be a firm or flexible ball (e.g., foam, polymer, composite, fiber, natural or synthetic rubber, etc.) which may have a hole through the center. The fibers can be fixed to the core using an adhesive and/or with fasteners, such as strings, bands, elastics, or the like. The core may not be present, and alternately, the keeper 112 can pierce through the scent disbursement component 102 to string the scent disbursement component 102 on the keeper 112.

The absorbent or fibrous material can be selected from various natural and/or synthetic fibers/textiles/filaments/sponges so that the scent disbursement component 102 absorbs fish attractant (e.g., scent oils, liquids, sauces, gels, etc.) and is able to hold and retain the attractant for an extended time while the scent disbursement component 102 is pulled through the water. Some example textile materials include polyester, polypropylene, and wool.

Additionally or alternately, a scent disbursement component 102 can include natural and/or artificial aquatic life components, such as eggs, roe, organs, body parts, and so forth, or combinations thereof. Further, a scent disbursement component 102 can include other natural and/or artificial life forms, food items, or other bait items that can release a scent that is attractive to game fish.

Representative Process

FIG. 8 illustrates a representative process 800 for implementing techniques and/or devices relative to providing a long-lasting artificial fishing lure (such as the lure 100, for example) with natural movement and with the added ability to lay down a long-term scent trail, according to various embodiments. The example process 800 is described with reference to FIGS. 1-7.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable hardware without departing from the scope of the subject matter described herein.

At block 802, the process includes providing a lure body having an upper portion and a lower portion, where at least one of the upper portion and the lower portion is spoon-shaped. In some examples, the upper portion of the lure body has a concave spoon shape and the lower portion has a convex spoon shape.

At block 804, the process includes providing a slot through the lure body between the upper portion and the lower portion. In an example, the process includes disposing the slot at a transition between a concave portion of the lure body and a convex portion of the lure body. In another example, the slot provides an opening for water to flow through the lure body while the lure body moves through the water. In the example, the process includes orienting the slot to a predetermined angle relative to a flow of water through the slot. In some cases, the orientation of the slot to the flow of water (or to the lure body) can determine a turbulence of the water through the slot or behind the lure body.

At block 806, the process includes movably coupling a first end of a keeper to the upper portion of the lure body. In some examples, the keeper comprises a wire. In those examples, the wire may have a feature at one end configured to attach the keeper directly to the lure body or to the lure body via a connection device (such as a split ring, or the like). In other examples, the keeper may comprise another component, such as a filament, a clip, a pin, and so forth.

At block 808, the process includes releasably attaching a replaceable scent disbursement component to the keeper. In some cases, the process includes inserting the keeper through the replaceable scent disbursement component or stinging the replaceable scent disbursement component onto the keeper. In an example, the process includes positioning the replaceable scent disbursement component at or near the upper portion. This may include nesting the replaceable scent disbursement component at a concave portion of the upper portion.

At block 810, the process includes releasably securing a second end of the keeper to the lure body. In an example, the process includes releasably inserting the second end of the keeper into the slot. This may include slightly bending (temporarily) the keeper to fit the second end of the keeper into the slot. When the keeper springs back to shape, the keeper is trapped in the slot and the replaceable scent disbursement component is trapped on the keeper. Removing the replaceable scent disbursement component from the keeper is a reverse operation, which can be done quickly by the user to replace a used replaceable scent disbursement component with a fresh one.

In an example, the process includes coupling one or more hooks to the lower portion of the lure body. Further, a fishing line (and associated accessories) can be coupled to the upper portion of the lure body.

In alternate implementations, other techniques may be included in the process in various combinations and remain within the scope of the disclosure. Although various implementations and examples are discussed herein, further implementations and examples may be possible by combining the features and elements of individual implementations and examples.

This discussion of exemplary advantages, features, and embodiments is illustrative only and is not intended to be limiting. Based on the disclosure, it will be understood that additional advantages are provided by aspects described herein. Alternative aspects will become apparent to those skilled in the art that do not depart from its scope. A skilled artisan may develop alternative means of implementing the aforementioned improvements without departing from the scope of the present disclosure It will be understood that certain features and sub combinations are of utility and may be employed without reference to other features and sub combinations and are contemplated within the scope of the claims.

The illustrations of FIGS. 1-8 are not intended to be limiting. In the various example embodiments illustrated in FIGS. 1-8, the location and position of the components, connections, and the like are for example only. Other locations and positions are contemplated and are within the scope of this disclosure. In some cases, additional or alternative components, techniques, sequences, or processes may be used to implement the techniques described herein.

CONCLUSION

While various discreet embodiments have been described throughout, the individual features of the various embodiments may be combined to form other embodiments not specifically described. The embodiments formed by combining the features of described embodiments are also within the scope of the disclosure.

The invention claimed is:

1. A fishing lure, comprising:
   a lure body comprised of an upper portion and a lower portion, at least one of the upper portion and the lower portion being spoon-shaped;
   a slot disposed through the lure body between the upper portion and the lower portion;
   a replaceable scent disbursement component releasably attached to the lure body; and
   a keeper movably coupled to the upper portion of the lure body, and configured to releasably attach the replaceable scent disbursement component to the lure body.

2. The fishing lure of claim 1, further comprising one or more hooks coupled to the lower portion of the lure body.

3. The fishing lure of claim 1, wherein the slot is disposed at a transition between the upper portion and the lower portion.

4. The fishing lure of claim 1, wherein the slot forms an opening for water to pass through the lure body.

5. The fishing lure of claim 1, wherein the keeper comprises a metal wire or a composite or polymer filament.

6. The fishing lure of claim 1, wherein the replaceable scent disbursement component is configured to be strung onto the keeper, with the keeper disposed through the replaceable scent disbursement component.

7. The fishing lure of claim 1, wherein the replaceable scent disbursement component is disposed in a nested position at the upper portion, upstream from the slot.

8. The fishing lure of claim 1, wherein a first end of the keeper is movably coupled to the upper portion and a second end of the keeper is configured to be inserted into the slot to releasably couple the replaceable scent disbursement component to the lure body.

9. A fishing lure, comprising:
   a lure body with an ellipsoid shaped perimeter, comprised of an upper portion and a lower portion, at least one of the upper portion and the lower portion being spoon-shaped;
   a slot disposed through the lure body between the upper portion and the lower portion;
   a replaceable scent disbursement component releasably attached to the lure body at the upper portion;
   a wire keeper movably coupled to the upper portion of the lure body at a first end of the keeper and configured to be inserted into the slot at a second end of the keeper, the keeper configured to be disposed through the replaceable scent disbursement component to releasably couple the replaceable scent disbursement component to the lure body; and
   one or more hooks coupled to the lower portion of the lure body.

10. The fishing lure of claim 9, wherein the upper portion of the lure body has a concave spoon shape.

11. The fishing lure of claim 10, wherein the replaceable scent disbursement component is nested at the concave spoon shape of the upper portion when coupled to the lure body.

12. The fishing lure of claim 9, wherein the lower portion of the lure body has a convex spoon shape.

13. The fishing lure of claim 9, wherein the slot is disposed transversely with respect to a length of the lure body.

14. A method, comprising:
   providing a lure body having an upper portion and a lower portion, at least one of the upper portion and the lower portion being spoon-shaped;
   providing a slot through the lure body between the upper portion and the lower portion;
   movably coupling a first end of a keeper to the upper portion of the lure body;
   releasably attaching a replaceable scent disbursement component to the keeper; and
   releasably securing a second end of the keeper to the lure body.

15. The method of claim 14, further comprising disposing the slot at a transition between a concave portion of the lure body and a convex portion of the lure body.

16. The method of claim 14, further comprising orienting the slot to a predetermined angle relative to a flow of water through the slot.

17. The method of claim 14, further comprising inserting the keeper through the replaceable scent disbursement component.

18. The method of claim 14, further comprising releasably inserting the second end of the keeper into the slot.

19. The method of claim 14, further comprising coupling one or more hooks to the lower portion of the lure body.

20. The method of claim 14, wherein the upper portion has a concave spoon shape and the lower portion has a convex spoon shape, and further comprising positioning the replaceable scent disbursement component at the upper portion.

* * * * *